United States Patent
Hillebrand et al.

(10) Patent No.: US 9,928,803 B2
(45) Date of Patent: Mar. 27, 2018

(54) METHOD FOR GENERATING A CONTROL PROGRAM THAT CAN BE EXECUTED ON A CONTROL SYSTEM

(71) Applicant: dSPACE digital signal processing and control engineering GmbH, Paderborn (DE)

(72) Inventors: Sebastian Hillebrand, Marsberg (DE); Karsten Fischer, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 256 days.

(21) Appl. No.: 14/640,315

(22) Filed: Mar. 6, 2015

(65) Prior Publication Data
US 2015/0255038 A1   Sep. 10, 2015

(30) Foreign Application Priority Data
Mar. 6, 2014  (EP) .................................. 14158000

(51) Int. Cl.
*G06F 3/048*     (2013.01)
*G09G 5/00*     (2006.01)
(Continued)

(52) U.S. Cl.
CPC ......... *G09G 5/006* (2013.01); *G05B 19/0426* (2013.01); *G06F 8/34* (2013.01);
(Continued)

(58) Field of Classification Search
None
See application file for complete search history.

(56) References Cited

U.S. PATENT DOCUMENTS 6,115,795 A * 9/2000 Gilda ................. G06F 12/0811
                                                    711/118
6,804,642 B1 * 10/2004 Naylor .................. G10L 15/285
                                                    704/231
(Continued)

FOREIGN PATENT DOCUMENTS

DE    10 2004 037 686 A1    2/2005
DE       103 47 891 A1      5/2005

OTHER PUBLICATIONS

Cong, Jason, and Yi Zou. "Parallel multi-level analytical global placement on graphics processing units." Proceedings of the 2009 International Conference on Computer-Aided Design. ACM, 2009. (Year: 2009).*

(Continued)

*Primary Examiner* — Matthew J Brophy
(74) *Attorney, Agent, or Firm* — Muncy, Geissler, Olds & Lowe, P.C.

(57) ABSTRACT

A computer-implemented method for generating a control program that is executable on a control system from a graphical control model. A better utilization of the control system is achieved in that the graphical control model is translated into program code such that the generated program code has at least one FXP operation and at least one FLP operation, and in that the generated program code is translated into the executable control program such that when the control program is executed on the control system a portion of the control program is executed on the FXP unit and another portion of the control program is executed on the FLP unit.

15 Claims, 7 Drawing Sheets

(51) Int. Cl.
*G05B 19/042* (2006.01)
*G06F 9/44* (2018.01)

(52) U.S. Cl.
CPC .............. *G05B 2219/23217* (2013.01); *G05B 2219/23258* (2013.01); *G05B 2219/23266* (2013.01); *G05B 2219/23292* (2013.01); *G09G 2340/00* (2013.01)

(56) References Cited

U.S. PATENT DOCUMENTS

| | | | | |
|---|---|---|---|---|
| 7,137,100 B2* | 11/2006 | Iborra | ...................... | G06F 8/30 717/104 |
| 7,752,559 B1* | 7/2010 | Szpak | ...................... | G06F 8/10 715/735 |
| 7,757,222 B2 | 7/2010 | Liao et al. | | |
| 7,821,520 B1* | 10/2010 | Bastos | ...................... | G06T 1/20 345/502 |
| 8,015,543 B1* | 9/2011 | Carrick | ...................... | G06F 8/35 717/106 |
| 8,219,378 B1* | 7/2012 | Koh | ........................... | G06F 8/30 703/20 |
| 8,522,196 B1 | 8/2013 | Kim et al. | | |
| 8,629,867 B2* | 1/2014 | Hickey | ................ | G06T 15/005 345/419 |
| 8,832,479 B2* | 9/2014 | Elnozahy | ............... | G06F 1/3203 713/320 |
| 9,235,395 B2* | 1/2016 | Kodosky | ................ | G06F 8/451 |
| 9,442,701 B1* | 9/2016 | Aldrich | ................ | G06F 8/34 |
| 9,612,806 B2* | 4/2017 | Conrad | .................... | G06F 8/35 |
| 9,678,726 B1* | 6/2017 | Massaguer | ............... | G06F 8/35 |
| 2004/0210869 A1* | 10/2004 | DeVane | .................... | G06F 8/10 717/114 |
| 2007/0266368 A1* | 11/2007 | Szpak | ...................... | G06F 8/10 717/105 |
| 2008/0172212 A1* | 7/2008 | Gahinet | ................. | G05B 17/02 703/6 |
| 2012/0254830 A1* | 10/2012 | Conrad | ............... | G06F 11/3604 717/106 |
| 2014/0059524 A1* | 2/2014 | Kee | ........................... | G06F 8/34 717/154 |
| 2014/0359589 A1* | 12/2014 | Kodosky | ................. | G06F 8/451 717/149 |
| 2014/0359590 A1* | 12/2014 | Kodosky | ................. | G06F 8/451 717/149 |
| 2016/0077811 A1* | 3/2016 | Kodosky | ................. | G06F 8/451 717/108 |

OTHER PUBLICATIONS

Banerjee, Prithviraj, et al. "A MATLAB compiler for distributed, heterogeneous, reconfigurable computing systems." Field-Programmable Custom Computing Machines, 2000 IEEE Symposium on. IEEE, 2000. (Year: 2000).*

European Search Report for European Application No. 14158000.1 dated Sep. 9, 2014 with English translation.

Holger Keding, Pain Killers for the Fixed-Point Design Flow, Synopsys Technical Backgrounder, pp. 1-15 (Mar. 2010).

Wikipedia, "Instruction Scheduling," pp. 1-3 (Aug. 4, 2011).

"Mixed floating/integer transform for faster LL testing," forum, pp. 1-4 (Dec. 8 2005).

* cited by examiner

METHOD FOR GENERATING A CONTROL PROGRAM THAT CAN BE EXECUTED ON A CONTROL SYSTEM

This nonprovisional application claims priority under 35 U.S.C. § 119(a) to European Patent Application No. EP 14158000.1, which was filed on Mar. 6, 2014, and which is herein incorporated by reference.

BACKGROUND OF THE INVENTION

Field of the Invention

The present invention relates to a computer-implemented method for generating a control program that is executable on a control system from a graphical control model, wherein the control system has a process interface and the control system is configured such that it is possible, through the process interface, for at least one process quantity of a physical process to be sensed by the control system and/or for an output quantity for influencing the physical process to be output by the control system, wherein the control system has at least one electronic computing unit with at least one fixed-point execution unit (FXP unit) and with at least one floating-point execution unit (FLP unit), and wherein the graphical control model has a number of model operations.

Description of the Background Art

Such methods for computer-assisted—which is to say computer-automated—generation of an executable control program from a graphical control model are known in the conventional art, and represent one of the fundamental functionalities of development environments for generating programs for control systems such as, e.g., control units. The graphical control model is generally present in the form of a block diagram, which is used to model and display the mathematical functionality of a control algorithm, for example. In industrial practice, such control systems are frequently present as a small computer embedded in a higher-level technical process; in the automotive field such control systems are generally referred to as control units.

Methods for generating an executable control program from a graphical control model are objectively referred to as code generators. They ensure the reliable and error-free translation of an abstract functional description (graphical control model) into a low-level program for the target system (control system). One method for generating a control program is described in detail in, for example, DE 10347891 A1, which is incorporated herein by reference.

The computing units of control systems typically have an integer arithmetic logic unit, often referred to as an integer execution unit (IEU), hereinafter referred to as a fixed-point execution unit (FXP unit). Using these integer or fixed-point execution units, both integers and fixed-point numbers can be processed, since fixed-point arithmetic corresponds to integer arithmetic in principle. Because fixed-point operations and floating-point operations (FLP operations) are discussed below, the integer arithmetic logic unit is referred to as a fixed-point execution unit (FXP unit) in contrast to a floating-point arithmetic logic unit, for which the term floating-point execution unit (FLP unit) is customary. With this understanding, fixed-point operations can also include integer operations.

Since it was previously common for electronic computing units, in particular of embedded control systems, to have only an FXP unit, all model operations of the graphical control model in methods known from the prior art are translated exclusively into fixed-point operations (FXP operations) of the generated program code. Although this practice ensures that the program code generated with the method used, and the control program translated therefrom, is in principle executable on practically any computing unit, the hardware resources are then only partially utilized if the electronic computing unit of the control system also has an FLP unit in addition to the FXP unit. Since the control systems considered here are as a general rule sampling systems operating under real-time conditions, and thus an arbitrarily large amount of time is not available for execution of the control program, more powerful control systems must be employed when the FXP unit is fully utilized and no additional calculation steps can be executed in the specified time period.

SUMMARY OF THE INVENTION

It is therefore an object of the present invention to provide a method for generating an executable control program from a graphical control model, with which the resources of the control system can be better utilized.

In an embodiment, the object is attained in a method for generation of an executable control program in that the graphical control model is translated into program code such that the generated program code has at least one FXP operation and at least one FLP operation and in that the generated program code is subsequently translated into the executable control program such that when the control program is executed on the control system a portion of the control program is executed on the FXP unit and another portion of the control program is executed on the FLP unit.

In the translation of the graphical control model into program code, the method according to the invention avoids generating only program code that uses solely the FXP unit or generating only program code that uses exclusively the FLP unit. The method according to the invention thus enforces that the graphical control model is processed on the target system both on the FXP unit and on the FLP unit, so that a better resource utilization results overall. In contrast to the prior art method, considerably more complex control programs can be processed on one and the same control system than is the case with control programs that have been generated according to conventional code generation methods. In this way it is possible, using one and the same control system, to act on the connected physical process through the process interface with higher sampling rates and/or while exchanging a larger number of process quantities.

A further development of the computer-implemented method is characterized in that a sufficient number of model operations of the control model are converted into FXP operations and FLP operations of the program code such that averaged over time, comparable utilizations of the FXP units and FLP units of the computing unit of the control system result. The uniform utilization of the FXP and FLP units has the consequence that on average the result is the lowest possible utilization of the units, so that the probability is low that run-time variations on the units will bring about a violation of real-time conditions.

Provision is made according to an embodiment of the method that the ratio of the number of FXP operations of the program code to the number of FLP operations can correspond to the ratio of FXP operations that can be executed on the FXP units per unit time to FLP operations that can be executed on the FLP units per unit time. This result can easily be achieved automatically by the method if provision is made to take into account how many clock cycles the control system's computing unit, or the various units of the computing unit, require for specific FXP and FLP operations. The selection of the model operations of the control model to be converted can be made randomly or according to specific selection criteria, which are discussed below.

The single circumstance of the utilization by the control program of the FXP unit and the FLP unit of the computing unit is already advantageous in and of itself, even without taking into account the time coordination of the calculations. An especially great effect is produced in another preferred embodiment of the computer-implemented method when the mixing of FXP operations of the program code with FLP operations of the program code is sufficiently high that when the control program is executed on the computing unit of the control system, the program code or the control program is executed simultaneously on the FXP units and the FLP units of the computing unit. Thus, the required mixing of FXP operations with FLP operations has the result that the FXP units and the FLP units are supplied with instructions such that they actually perform calculations simultaneously and not merely in alternation, which achieves the maximum run-time effect.

The method according to an embodiment of the invention results in an advantageous effect even when, for example, merely a random selection of model operations of the control model is converted into appropriate FLP operations and FXP operations of the program code; however, according to an embodiment of the method there are also criteria that can be applied in a targeted manner to decide which portions of the control model are especially suitable for a conversion.

In an embodiment of the computer-implemented method, provision is made that integer model operations of the control model are converted into FXP operations of the program code for processing on an FXP unit. Such integer model operations, for example incrementing or decrementing counters for loops, switch case operations, or even bit operations, show no evident advantage from a conversion to the floating-point data type.

However, it may be advantageous to convert a model operation of the control model that would undergo a fixed-point rescaling when implemented as an FXP operation in the program into an FLP operation of the program code. By this means the computational steps for the fixed-point rescaling can be saved, so that an original floating-point calculation saves time and the necessary conversion from FXP to FLP in the program code is of no further consequence. According to another embodiment of the method, provision is made that, if the computing unit has an m-bit FLP unit but does not have an m-bit FXP unit, a model operation in the control model that would result in one or more m-bit FXP operations in the program code when converted into FXP operations in the program code is instead converted into one or more m-bit FLP operations in the program code. For example, if the model specification results in a 64-bit FXP operation in the program code, but only a 32-bit FXP unit is present, then the required 64-bit operation must be reproduced with multiple individual 32-bit FXP operations in the generated code, which is very resource-intensive. In this case it is very worthwhile to perform a conversion into 64-bit FLP operations if a 64-bit FLP unit is present in the computing unit.

In graphical control models, there are operations that are linked serially and in parallel, where serially linked operations are required to be performed sequentially in time because the result of one operation is an input quantity for the following operation. Parallel operations or parallel processing threads of the control model can also be processed in parallel in terms of time, since the values processed in the different processing threads have no mutual influence on one another.

According to an embodiment of the method according to the invention, provision is made that, for multiple parallel processing threads of the control model, the threads of model operations of the control model that have the most FXP rescalings, or that would have the most FXP rescalings when converted into FXP operations, can be converted into FLP operations of the program code. These FXP rescalings in the program code are eliminated when FLP operations are used from the beginning. Preferably, the processing thread then does not switch between FLP operations and FXP operations, but instead stays with FLP operations in the program code. In this design, code sections of independent model processing threads can also be placed in the program code in alternation in order to further improve the utilization over time of the FXP and FLP units (to compensate for potential detection weaknesses in the compiler used, for example).

Control models are also conceivable in which model operations are intended or provided for translation into FXP operations or FLP operations in the program code. For control models of this nature, provision is made according to an advantageous embodiment of the method that at least one FLP operation of the control model is converted into an FXP operation of the program code and/or that at least one FXP operation of the control model is converted into an FLP operation of the program code. As a result of this measure, it is possible to establish almost any desired ratio of FXP operations and FLP operations within the program code, so that the utilizations of the FXP units and the FLP units of the computing unit of the control system can also be adjusted.

According to an exemplary embodiment, a selection of FLP operations of the control model are converted into FXP operations of the program code, and/or a selection of FXP operations of the control model can be converted into FLP operations of the program code, such that the number of translations caused by the conversion from the fixed-point data type to the floating-point data type in the program code, and/or from the floating-point data type to the fixed-point data type in the program code, is at least locally minimal. "Locally minimal" in this context can mean that not all possible selections of FLP operations and of FXP operations are necessarily evaluated, but instead only a portion of the theoretically possible selections, wherein the variants examined can be random selections, for example.

In another exemplary embodiment of the method, provision is made that the program code generated from the graphical control model can be present in a hardware description language, wherein the program code describes the computing unit of the control system with at least one FXP unit and with at least one FLP unit, wherein the computing unit additionally implements the functionality of the control model. Thus, not only is this program code executable on specific target hardware, but it even describes the target hardware. For example, provision can be made that the hardware description language describes and programs a field programmable gate array (FPGA). Hence, in this case the program code defines how the functional structures provided on the FPGA are interconnected and coordinated with one another. Since some modern FPGAs contain additional fixed hardware structures (called DSP units), which are employed specifically for, e.g., FLP operations, it is advantageous to account for the utilization/availability of such hardware elements in the mixing ratio of FXP and FLP program code.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
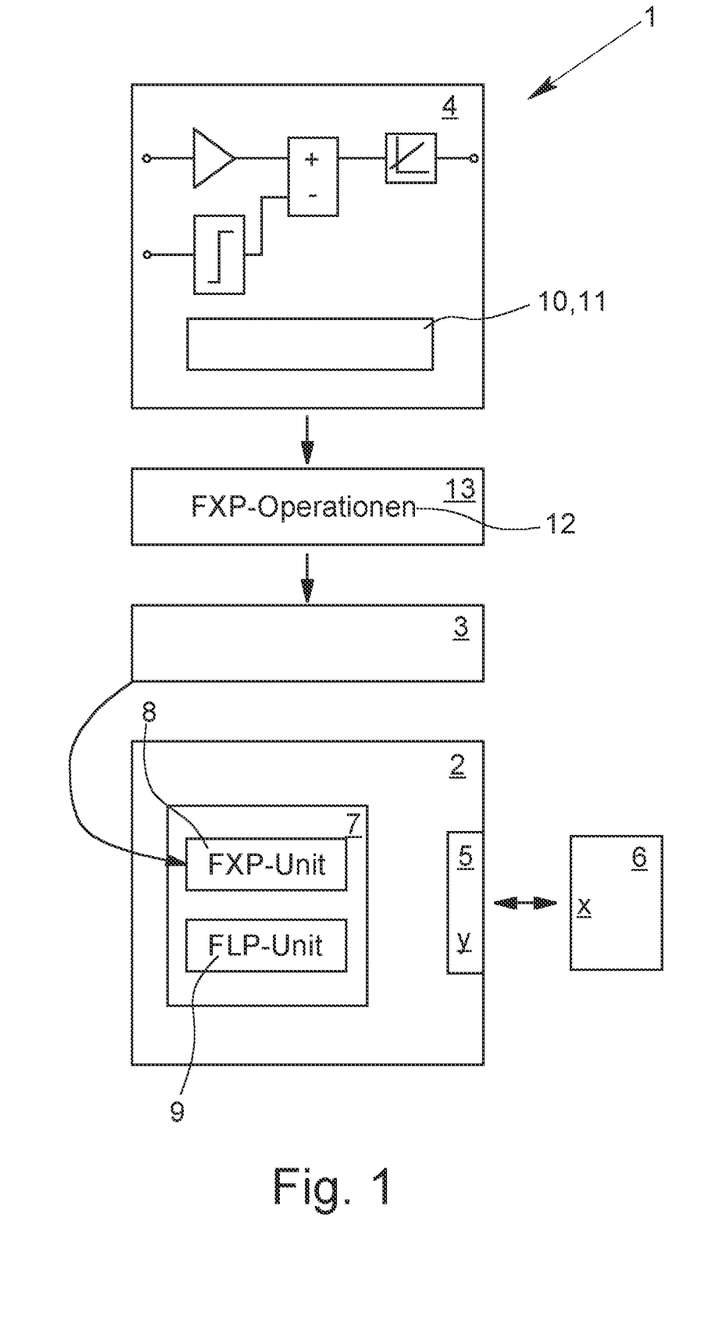
FIG. 1 shows a method for generating an executable control program on a control system.

FIG. 1 shows a computer-implemented method 1 for generating a control program 3 that can be executed on a control system 2 from a graphical control model 4, wherein the control system 2 has a process interface 5. The control system 2 is configured such that at least one process quantity x of a physical process 6 can be sensed by the control system 2 through the process interface 5 and/or an output quantity y for influencing the physical process 6 can be output by the control system 2 through the process interface. The control system 2 has an electronic computing unit 7 with a fixed-point execution unit (FXP unit) 8 and with a floating-point execution unit (FLP unit) 9.

The graphical control model 4 in the example shown comprises a number of model operations 10, 11. The model operations 10, 11 of the control model 4 are nonspecific with regard to data type in the present case. If a simulation is to be carried out directly with the control model 4 ("offline simulation"), the calculations are as a general rule carried out completely as FLP operations; however, this has nothing directly to do with the code generation process from the control model 4 that is of interest here and is the subject of the rest of the description.

Pursuant to FIG. 1, it is known from the prior art to translate all model operations 10, 11 of the graphical control model 4 into FXP operations 12 of the program code 13, so that the generated program code 13 is in a sense "universally" usable, since customary control systems 2 have at least one FXP unit 8 for processing integer or fixed-point numbers, but do not necessarily have an FLP unit 9 for processing floating-point operations. This practice has the result that the control system 2 is only partially utilized, since no use is made of the FLP unit 9.

Figure 2:
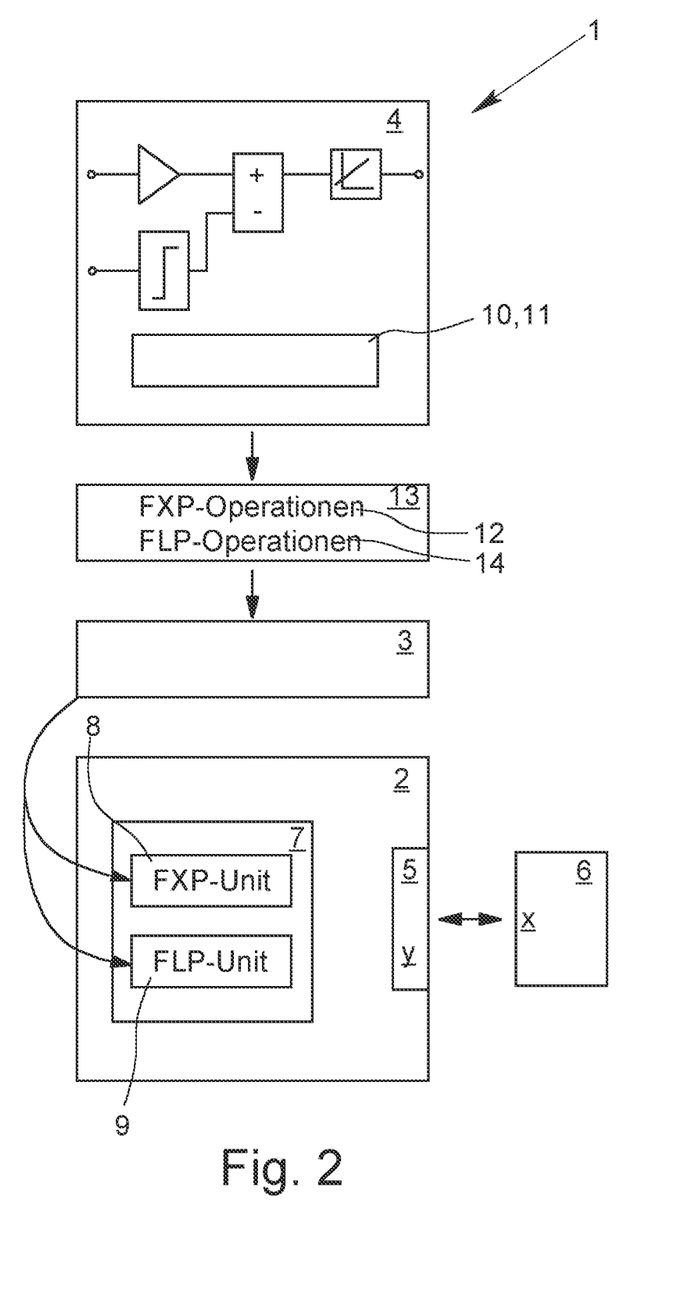
FIG. 2 schematically shows a method according to an embodiment of the invention for generating a control program for a control system.

In contrast, in the computer-implemented method according to the invention shown in FIG. 2, provision is made that the graphical control model 4 is translated into program code 13 such that the generated program code 13 has at least one FXP operation 12 and at least one FLP operation 14, and the generated program code 13 is translated into the executable control program 3 such that when the control program 3 is executed on the control system 2, a portion of the control program 3 is executed on the FXP unit 8 and another portion of the control program 3 is executed on the FLP unit 9. This can mean that both units 8, 9 of the computing unit 7 of the control system 2 are used.

The transmission of the control program 3 to both the FXP unit 8 and the FLP unit 9 of the control system 2 is indicated in FIG. 2 by the double arrow between the control program 3 and the computing unit 7. The measure that the generated program code 13 has at least one FXP operation 12 and at least one FLP operation 14 ensures that both the FXP unit 8 and the FLP unit 9 of the computing unit 7 of the control system 2 are used, which improves the run-time behavior as compared to the exemplary embodiment shown in FIG. 1.

FIG. 3 shows again in greater detail that some model operations 10, 11 of the control model 4 are translated into FXP operations 12 of the program code 13 and that some model operations 10, 11 of the control model 4 are converted into FLP operations 14 of the program code 13. The conversions take place here with the provision that a sufficient number of model operations 10, 11 of the control model 4 have been converted into FXP operations 12 of the program code 13 and a sufficient number of model operations 10, 11 of the control model 4 have been converted into FLP operations 14 of the program code 13 that averaged over time, comparable utilizations of the FXP unit 8 and the FLP unit 9 of the computing unit 7 result.

Figure 3:
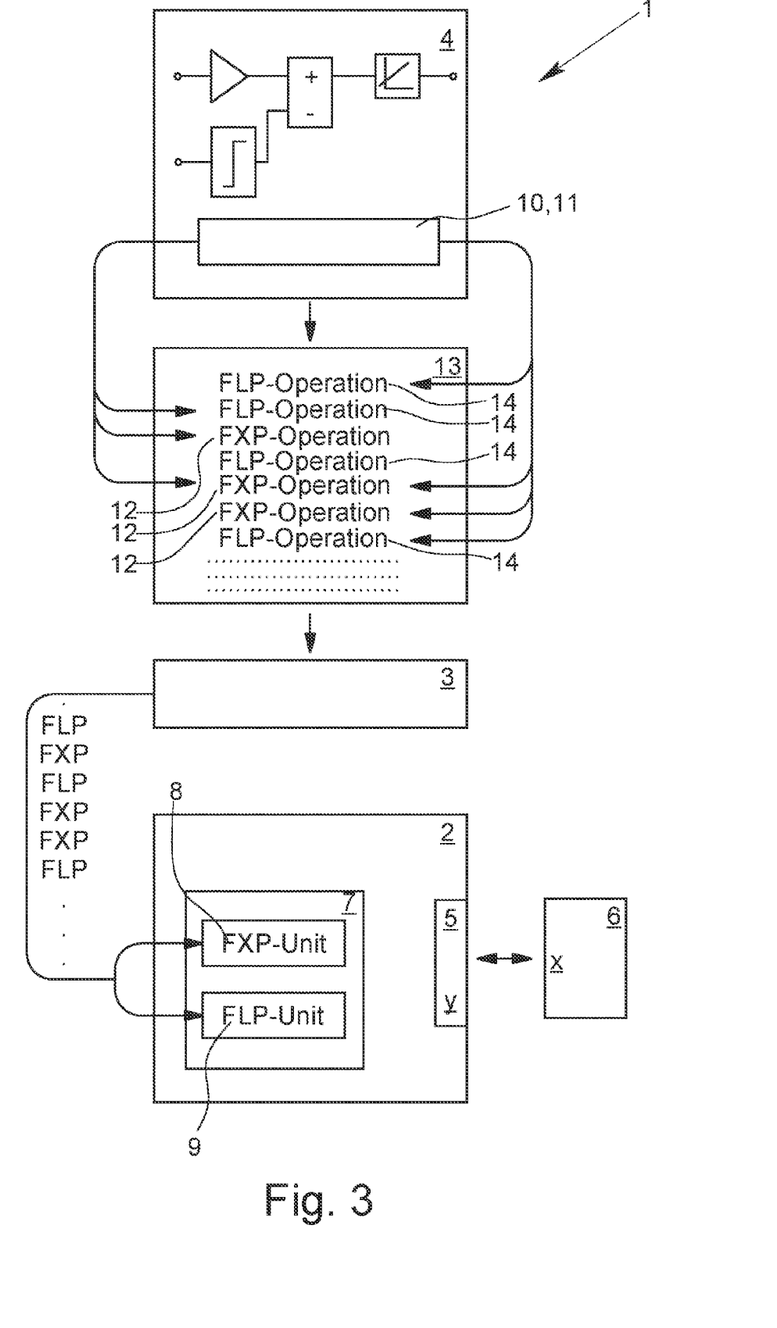
FIG. 3 schematically shows an embodiment of the method according to the invention for generating a control program.

In selecting the model operations 10, 11 of the control model 4 to be converted, it is also taken into account that the mixing of FXP operations 12 of the program code 13 with FLP operations 14 of the program code 13 is sufficiently high that when the control program 3 is executed on the computing unit 7 of the control system 2, the program code 13 is executed simultaneously on the FXP unit 8 and the FLP unit 9 of the computing unit 7. The simultaneous execution of the operations and the simultaneous use of the units 8, 9 of the computing unit 7 achieves the greatest effect with regard to optimized run time of the control program 3.

It is further evident from FIG. 3 that as a result of the measures described above, a mixing of FLP and FXP instructions is also achieved in the instruction flow—indicated between the control program 3 and the units 8, 9 of the computing unit 7—so that simultaneous utilization of both processing units 8, 9 is also ensured in supplying both units 8, 9.

Figure 4:
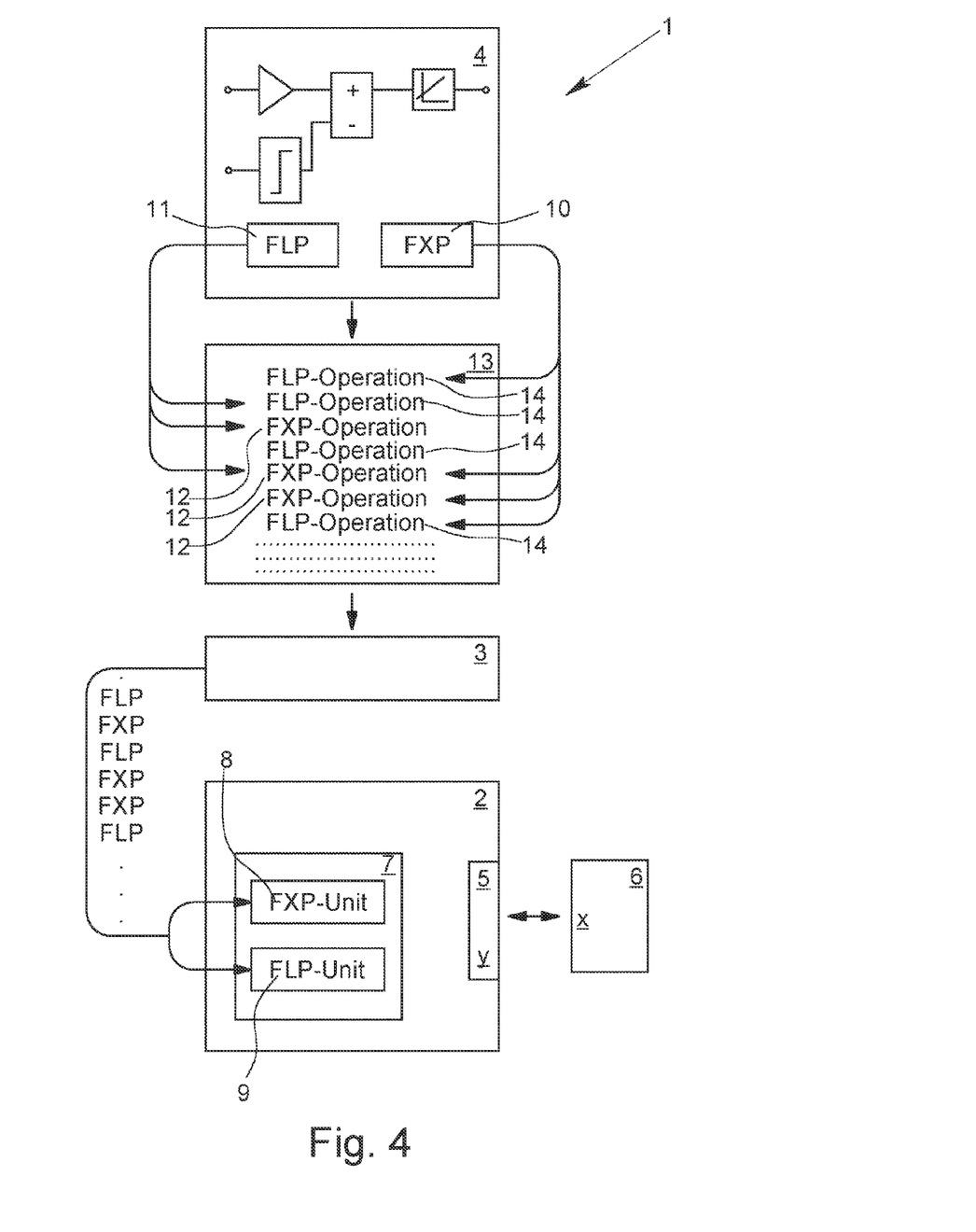
FIG. 4 schematically shows an embodiment, based on FIG. 3, of the method according to the invention for generating a control program.

The method flow 1 depicted in FIG. 4 is based largely on the method flow 1 depicted in FIG. 3. The primary difference is that some model operations are already designated or provided in the control model 4 as FXP operations 10, and some model operations as FLP operations 11, for the code generation. According to the method, it now is not just FXP operations 10 of the control model 4 that are translated into FXP operations 12 of the program code 3, and FLP operations 11 of the control model 4 that are translated into FLP operations 14 of the program code 13. Instead, provision is made that at least one FLP operation 11 of the control model 4 is converted into an FXP operation 12 of the program code 13 and/or that at least one model operation provided as an FXP operation 10 in the control model 4 is converted into an FLP operation 14 of the program code 13. In this process, it is preferable to proceed such that a selection of model operations intended as FLP operations 11 of the control model 4 are converted into FXP operations 12 of the program code 13, and/or that a selection of model operations intended or provided as FXP operations 12 of the control model 4 are converted into FLP operations 14 of the program code 13, such that the number of translations caused by the conversion from the fixed-point data type to the floating-point data type in the program code 13 and/or from the floating-point data type to the fixed-point data type in the program code 13 is at least locally minimal.

Figure 5:
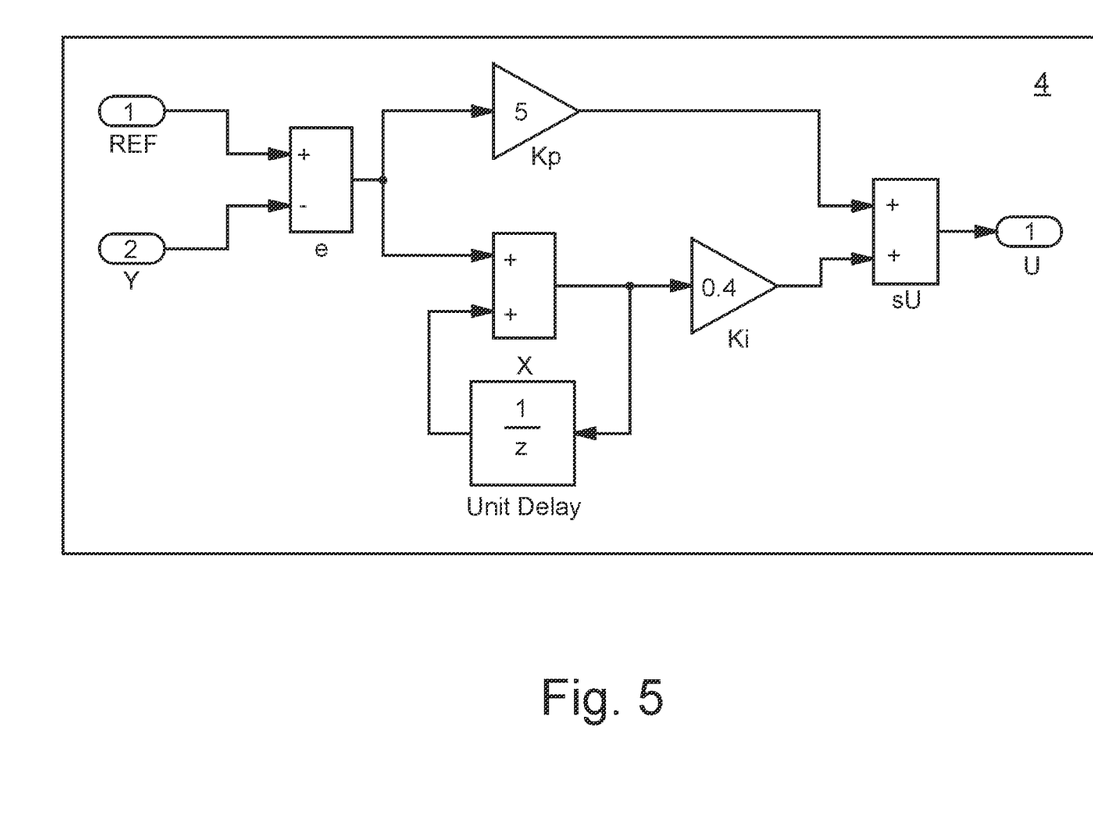
FIG. 5 shows a graphical control model that is to be translated into a control program.
Figure 6:
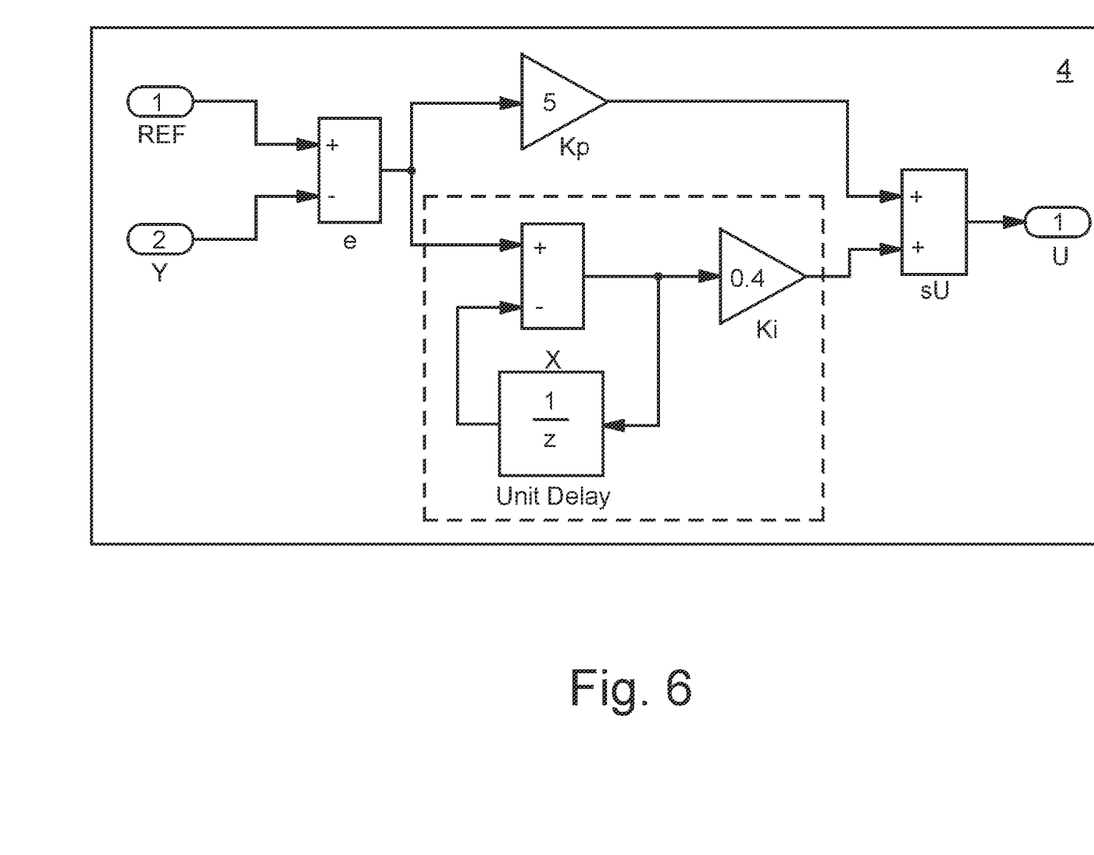
FIG. 6 shows the graphical control model from FIG. 5 with a marked model portion that is implemented with FLP operations.
Figure 7:
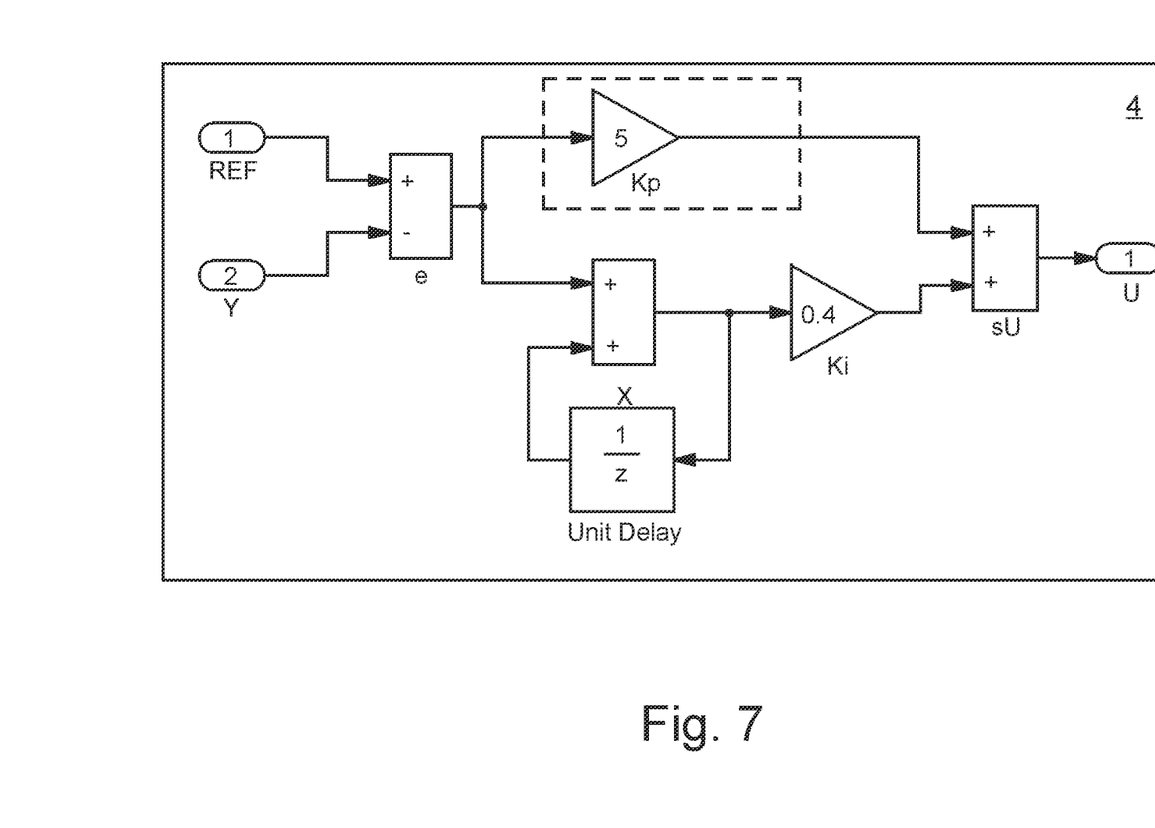
FIG. 7 shows the control model from FIG. 5 with another marked model portion that is translated into FLP operations.

FIGS. 5, 6, and 7 each depict the same graphical control model 4 in the form of a block diagram with transmission elements. The control deviation e is first produced from the two input quantities. The control deviation e is multiplied by the factor Kp in an upper processing thread and, after a fed-back delay element (unit delay), is multiplied by the factor Ki in a lower processing thread. The results of the two processing threads are added in the subsequent summation element sU to produce the output quantity U.

The result of a translation of the control model 4 into program code that contains exclusively FXP operations is shown below with reference to FIG. 4. This example—as is also the case for the examples of program codes that follow—is implemented in the C programming language. Since FXP operations operate only with quantities of the integer data type, the program code contains only int variables. In order to be able to combine the differently scaled integer and fixed-point numbers with one another, appropriate shift operations ("<<", ">>") must be performed. The details of fixed-point arithmetic, which is known per se, are not important here; all that is important is the circumstance that the program code example shown ultimately results in a control program that can be executed solely on the FXP unit 8 from FIGS. 1 to 4, so the hardware resources are only partially utilized.

```
int e /* LSB: 2^-10 OFF: 0 MIN/MAX: -32 .. 31.9990234375 */;
int x /* LSB: 2^-6 OFF: 0 MIN/MAX: -512 .. 511.984375 */;
static unsigned int Unit_Delay = 0 /* LSB: 2^-6 OFF: 0 MIN/MAX:
                              0 .. 1023.984375 */;
e = (int) ((((int) REF) - ((int) Y)) >> 1);
x = (int) (((unsigned int) (int) (e >> 4)) + Unit_Delay);
Unit_Delay = (unsigned int) x;
sU = (int) (((int) (((int) e) * ((int) P_Kp)) >> 7)) + ((int)
       ((((int) x) * ((int) P_Ki)) >> 6)));
U = sU;
```

The following code example reproduces the complete conversion of the control model 4 shown in FIG. 5 into program code that is implemented exclusively with FLP operations, and consequently contains only quantities of the float data type. Since floating-point operations are involved here, continual rescaling as in the case of the FXP operations is not necessary. Such a program code translated into a control program would be executed solely on the FLP unit of the computing unit 7 of the control system 2, so the FXP unit 8 would remain unused.

```
float e;
float x;
static float Unit_Delay = 0.F;
e = REF - Y;
x = e + Unit_Delay;
Unit_Delay = x;
sU = (e * P_Kp) + (x * P_Ki);
U = sU;
```

It is assumed in each of the exemplary embodiments from FIGS. 6 and 7 that the conversion of the graphical control model 4, or of the operations depicted there, normally takes place into FXP operations in the program code. The regions marked with dashed lines each indicate the portion of the control model 4 that is to be translated into FLP operations in the program code.

The program code presented below represents the conversion of the control model 4 from FIG. 6. It is immediately evident that the program code generated has both floating-point and fixed-point operations (FLP and FXP operations), with the result that the control program created therefrom is executed both on the FXP unit 8 shown in FIGS. 1 to 4 and on the FLP unit 9.

```
float Ki;
float x;
int Kp /* LSB: 2^-6 OFF: 0 MIN/MAX: -512 .. 511.984375 */;
int e /* LSB: 2^-10 OFF:0 MIN/MAX: -32 .. 31.9990234375*/;
e = (int) ((((int) REF) - ((int) Y)) >> 1);
Kp = (int) ((((int) e) * ((int) P_Kp)) >> 7);
x = (((float) e) * 0.0009765625F) + Unit_Delay;
Ki = x * P_Ki;
sU = (int) (((((float) Kp) * 0.015625F) + Ki) * 64.F);
U = sU;
Unit_Delay = x;
```

The program code that follows here represents a conversion of the control model 4 depicted in FIG. 7, wherein only the multiplication of the control deviation e by the factor Kp is carried out in floating-point arithmetic. Accordingly, only the variable Kp is of the float data type; all other variables and calculations are of the int data type or are FXP operations.

```
float Kp;
int Ki /* LSB: 2^-6 OFF: 0 MIN/MAX: -512 .. 511.984375 */;
int e /* LSB: 2^-10 OFF: 0 MIN/MAX: -32 .. 31.9990234375 */;
int x /* LSB: 2^-6 OFF: 0 MIN/MAX: -512 .. 511.984375 */;
e = (int) ((((int) REF) - ((int) Y)) >> 1);
Kp = ((float) e) * 0.0009765625F * P_Kp;
x = (int) (((unsigned int) (int) (e >> 4)) + Unit_Delay);
Ki = (int) ((((int) x) * ((int) P_Ki)) >> 6);
sU = (int) ((Kp + (((float) Ki) * 0.015625F)) * 64.F);
U = sU;
Unit_Delay = (unsigned int) x;
```

Comparison of the above program code examples shows that the selection of the portions of a graphical control model 4 that are to be converted into FXP operations and FLP operations of the program code has an effect on the mixing of the program code with regard to the two different types of operations. Mixings of this type can be achieved in a targeted manner with the criteria explained in the general part of the description.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for generating an executable control program that is executable on a control system from a graphical control model, the control system having a process interface and configured, through the process interface, for at least one process quantity of a physical process to be sensed by the control system and/or for an output quantity for influencing the physical process to be output by the control system, the control system having at least one electronic computing unit with at least one fixed-point (FXP) execution unit and with at least one floating-point (FLP) execution unit, and the graphical control model having a plurality of operations and a plurality of multiple parallel processing threads, the method comprising:
   translating the graphical control model into program code such that the generated program code has at least one FXP operation and at least one FLP operation; and
   translating the generated program code into the executable control program such that when the executable control program is executed on the control system a first portion of the executable control program is executed on the FXP unit and a second portion of the executable control program is executed on the FLP unit,
   wherein at least a first thread of the multiple parallel process threads is translated into the at least one FXP operation of the program code,
   wherein at least a second thread of the multiple parallel process threads is translated into the at least one FLP operation of the program code, and
   wherein translation of the program code to the at least one FXP operation or the at least one FLP operation is selected to balance processing load between the at least one fixed-point (FXP) execution unit and the at least one floating-point (FLP) execution unit of the computing unit.

2. The computer-implemented method according to claim 1, wherein some of the operations of the control model are converted into FXP operations and FLP operations of the program code such that, averaged over time, the FXP units and the FLP units of the computing unit of the control system are utilized equally.

3. The computer-implemented method according to claim 1, wherein a mixing of FXP operations of the program code with FLP operations of the program code is such that when the executable control program is executed on the control unit of the control system, the program code is executed substantially simultaneously on the FXP units and the FLP units of the computing unit.

4. The computer-implemented method according to claim 1, wherein a first ratio of FXP operations to FLP operations of the program code substantially equals a second ratio of FXP operations that are executable on the FXP units per unit time to FLP operations that are executable on the FLP units per unit time.

5. The computer-implemented method according to claim 1, wherein integer operations of the control model are converted into FXP operations of the program code for processing on the FXP unit for incrementing or decrementing counters for loops, switch case operations, or bit operations.

6. A computer-implemented method for generating an executable control program that is executable on a control system from a graphical control model, the control system having a process interface and configured such that it is possible, through the process interface, for at least one process quantity of a physical process to be sensed by the control system and/or for an output quantity for influencing the physical process to be output by the control system, the control system having at least one electronic computing unit with at least one fixed-point execution unit and with at least one floating-point execution unit, and the graphical control model having a number of model operations, the method comprising:
   translating the graphical control model into program code such that the generated program code has at least one FXP operation and at least one FLP operation; and
   translating the generated program code into the executable control program such that when the executable control program is executed on the control system a portion of the executable control program is executed on the FXP unit and another portion of the executable control program is executed on the FLP unit,
   wherein a model operation of the control model that would undergo a fixed-point rescaling when implemented as an FXP operation in the program code is converted into an FLP operation of the program code.

7. The computer-implemented method according to claim 1, wherein, if the computing unit has an m-bit FLP unit but does not have an m-bit FXP unit, a model operation in the control model that would result in one or more m-bit FXP operations in the program code when converted into FXP operations in the program code is instead converted into one or more m-bit FLP operations in the program code.

8. A computer-implemented method for generating an executable control program that is executable on a control system from a graphical control model, the control system having a process interface and configured such that it is possible, through the process interface, for at least one process quantity of a physical process to be sensed by the control system and/or for an output quantity for influencing the physical process to be output by the control system, the control system having at least one electronic computing unit with at least one fixed-point execution unit and with at least one floating-point execution unit, and the graphical control model having a number of model operations, the method comprising:
   translating the graphical control model into program code such that the generated program code has at least one FXP operation and at least one FLP operation; and
   translating the generated program code into the executable control program such that when the executable control program is executed on the control system a portion of the executable control program is executed on the FXP unit and another portion of the executable control program is executed on the FLP unit,
   wherein for multiple parallel processing threads of the control model, threads of model operations of the control model that would have the most FXP rescalings in the program code when converted into FXP operations are converted into FLP operations of the program code.

9. The computer-implemented method according to claim 1, wherein at least one of the operations in the control model intended as an FLP operation is converted into one of the at least one FXP operation of the program code, or wherein at least one of the operations in the control model intended as an FXP operation is converted into one of the at least one FLP operation of the program code.

10. The computer-implemented method according to claim 9, wherein a selection of the operations intended as FLP operations of the control model are converted into FXP operations of the program code, or wherein a selection of the operations intended as FXP operations of the control model are converted into FLP operations of the program code such that a number of translations caused by the conversion from a fixed-point data type to a floating-point data type in the program code or from the floating-point data type to the fixed-point data type in the program code is at least locally minimal.

11. The computer-implemented method according to claim 1, wherein the program code generated from the graphical control model is present in a hardware description language, wherein the program code describes the computing unit of the control system with the at least one FXP unit and with the at least one FLP unit, wherein the computing unit implements the functionality of the control model.

12. The computer-implemented method according to claim 11, wherein the hardware description language describes and programs a field programmable gate array.

13. A computer program product with a computer program that has software for performing the method according to claim 8, the computer program being executed with a computer.

14. The product according to claim 13, wherein the computer has a memory, a processor, and a display device.

15. The computer-implemented method according to claim 1, and wherein the parallel processing threads that require FXP rescalings, if implemented as the at least one FXP operation in the program code, are converted into the at least one FLP operation of the program code.

* * * * *